Figure 1:
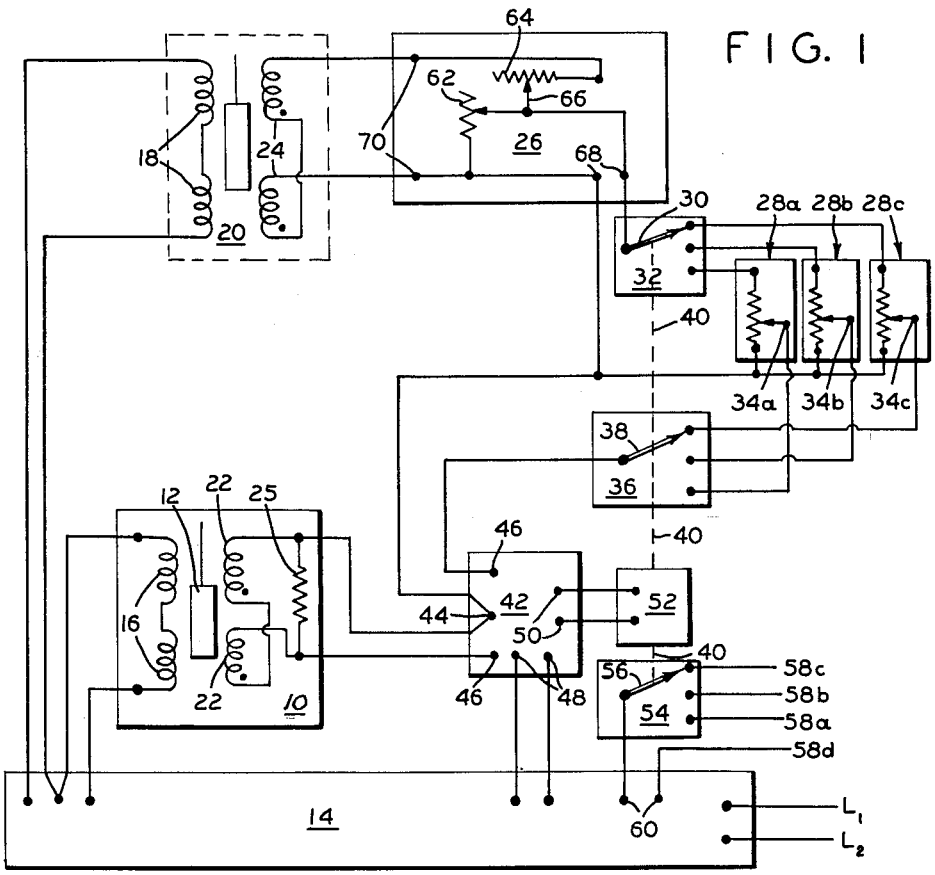

April 9, 1963  N. M. SLEEPER  3,085,191
APPARATUS FOR EFFECTING AUTOMATIC BATCHING
OF COMPOSITE MIXTURES
Filed March 19, 1959

INVENTOR.
NEAL M. SLEEPER
BY
BLAIR, SPENCER & BUCKLES.
ATTORNEYS.

3,085,191
APPARATUS FOR EFFECTING AUTOMATIC BATCHING OF COMPOSITE MIXTURES
Neal M. Sleeper, Rutland, Vt., assignor to Howe Richardson Scale Company, a corporation of Delaware
Filed Mar. 19, 1959, Ser. No. 800,529
19 Claims. (Cl. 323—51)

This invention relates to an improvement in apparatus for effecting automatic batching of composite mixtures and more particularly to a percentage batch control for incorporation into known control circuits for automatic batching. The apparatus of the invention facilitates single step selection of a total batch mass which is a continuously variable percentage of a preselected maximum batch mass.

In the United States patent application of William D. Macgeorge, Serial No. 657,639, filed May 7, 1957, entitled "Control Circuit," there is disclosed an improved control circuit for automatic batching of flowable materials and like applications in which a series of operations take place at predetermined positions of a measuring element. In that apparatus a differential transformer is disclosed, operated by a weighing platform. The movement of the weighing platform produces a corresponding signal in the differential transformer proportional to the weight of a mass of material added to the batch. The weighing signal from this differential transformer is added in series to a potentiometer selected portion of a reference signal produced in a second differential transformer having a relatively fixed core. The resultant signal is applied across a null actuated relay. The relay operates a stepping switch for the successive interconnection of a series of potentiometers into the signal circuit. Each potentiometer is preset to provide operation of the relay when a desired weight of material has been applied to the weighing platform. The stepping switch also operates a corresponding series of valves for controlling the flow of the preselected succession of ingredients to the weighing platform.

In the application for United States patent of Charles E. Roessler, Jr., Serial No. 740,969, filed June 9, 1958, entitled "Printed Circuit Formula Card Systems and Their Components," fixed voltage dividers are substituted for variable potentiometers for ingredient weight selection. A particular set of values for the arms of the voltage dividers, corresponding to a desired formula, is selected from a network of fixed resistors by a printed circuit card. The apparatus of the present invention is a modification of the control circuits disclosed in the above-described Macgeorge and Roessler applications.

In many industries, the concrete and asphalt industries for example, it is desirable to have a single control in an automatic batching system whereby the continuously variable voltage dividers or the selected fixed resistor voltage dividers of the control circuit may be preset for the proportions of the ingredients of a given maximum batch mass, and the control may then be operated to provide batches having masses from zero up to the maximum, and having the same proportions as the maximum batch. This object may not be accomplished by placing a potentiometer between the reference differential transformer and the preset voltage dividers, directly across the reference differential transformer secondary output, as variation of such a potentiometer, by introducing the voltage dividers in parallel across different portions of the potentiometer, will vary the effective load on the differential transformer and thereby vary the phase of the signal output. The phase shift so introduced by a potentiometer in parallel with the reference differential transformer and the voltage dividers will adversely affect the sensitivity and calibration of the control circuit. This variation in sensitivity and calibration will introduce an error into the percentage batch control.

It is therefore a principal object of this invention to provide a proportional control for variable control circuits whereby a series of operations preset to occur at given values of the control signal will each occur at a constant preselected percentage of the given control signal values.

Another object of this invention is to provide a control of the above character in the control circuit of an apparatus adapted to the automatic batching of composite mixtures.

A further object of the invention is to provide a circuit of the above character in which the proportion of the various ingredients may be preset. A still further object of the invention is to provide apparatus of the above character in which there is a preset maximum batch weight.

Another object of the invention is to provide apparatus of the above character in which the total weight of a particular batch produced may be a preset proportion of said maximum batch weight.

Still another object of the invention is to provide apparatus of the above character in which the total batch weight may be preset in a single operation, once a given formula has been set.

Yet another object of the invention is to provide an attenuator for the output of a differential transformer which is adapted to vary the magnitude of the output of the transformer while maintaining a constant load on said output.

A further object of the invention is to provide a control circuit of the character of the immediately preceding object in which a reference signal producing differential transformer has an attenuator associated therewith which varies the potential of of its output without varying the phase thereof. An additional object of the invention is to provide automatic batching of the above character in which differential transformers are the signal producing elements thereof.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 2:
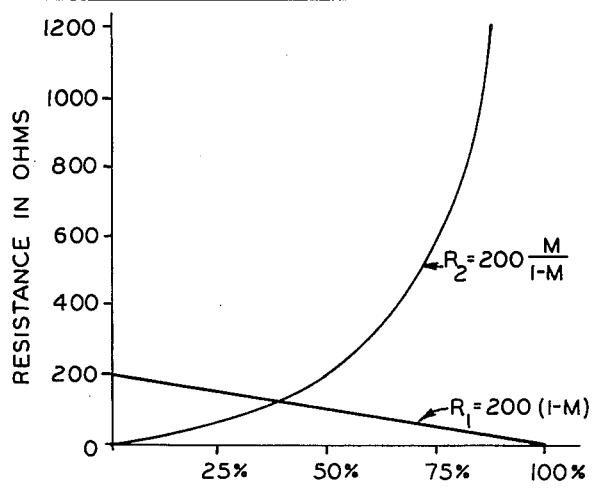

For a fuller understanding of the nature and objects of the invention, reference should be had to the following detailed description taken in conjunction with the accompanying drawing, in which:

FIGURE 1 is a schematic diagram of the control circuit of the present invention; and FIGURE 2 is a graph showing the resistance variations of the variable resistors of the present invention as functions of the percentage of the maximum batch weight selected.

In general, the present invention consists of the introduction of an attenuator into the control circuits of Macgeorge and Roessler (as disclosed in the above identified application) between the reference signal producing differential transformer and the series of voltage dividers corresponding to each control operation, or in the case of automatic batching, to each ingredient. By maintaining the load provided by the series of voltage dividers, constant, an attenuating network may be provided between the voltage dividers and the reference signal producing differential transformer which will vary the voltage applied across the voltage dividers and yet not vary the load on the differential transformer. The attenuating network consists of a linearly varying variable resistor and a non-linearly varying variable resistor in series across the output terminals of the reference signal producing differential transformer. The voltage dividers are connected in parallel across the non-linearly varying variable resistor.

More particularly, referring to FIGURE 1, the signal producing differential transformer 10 has its moveable core 12 positioned in response to the actuating variable. In the case of automatic batching this would ordinarily be the movement of some element in the weighing scales themselves. The receiver or reference signal producing differential transformer 20 and control elements of the control circuit may be located at a distance from the signal producing differential transformer and may be mounted on a single chassis.

A power supply indicated generally at 14 supplies current to the primary coils 16 and 18 of the differential transformers, 10 and 20 respectively. The primaries of each of these transformers are connected internally in series aiding relation and externally in series with each other and with the power supply as is well known in the art. The secondaries 22 and 24 of the signal and reference differential transformers, 10 and 20 respectively, are connected in series bucking relationship as is also well known in the art. A matching impedance, for example resistor 25, is connected across the secondaries of the signal producing differential transformer 10 so that the load on this transformer will be the same as the load on the reference differential transformer 20. The signal transformer 10, itself, normally will require a resistor to match the load on the reference transformer 20. However, if the resistance of the wiring of the control circuit, including the leads from the secondaries 22 of the signal transformer 10 are great enough, a capacitor will be required as impedance 25.

The signal from the reference differential transformer 20 is applied to the attenuator generally indicated at 26. One of the output terminals 68 is connected to a common junction of the voltage dividers 28a, 28b and 28c whereas the other of the terminals of the output terminals 68 is connected so that the attenuated signal is applied to the wiper 30 of the multipole switch 32. The various positions of this switch apply the attenuated signal to one of the voltage dividers 28a, 28b and 28c at each position of the wiper 30. The third terminals 34a, 34b and 34c of the voltage dividers 28a, 28b and 28c are connected to a second multipole switch 36 having a wiper 38. The two multipole switches are ganged together, as shown by the dotted line 40, for simultaneous operation thereof. The poles are connected so that when the wiper 30 applies the attenuated signal across the voltage divider 28b, for example, the third terminal 34b of the same voltage divider will be connected into the circuit by the wiper 38 of the second multipole switch 36.

The resultant reference signal from the voltage dividing network is then applied, in series with the signal from the signal producing transformer 10, to the null detecting relay 42. The secondaries 22, 24 of the two differential transformers 10, 20 are thus connected together at the common terminal 44. The signal resultant from the addition of the signal produced by the signal producing differential transformer 10 to the attenuated and voltage divided signal from the reference producing differential transformer 20 appears across the control terminals 46—46 of the null detecting relay 42. As is well known in the art, this null detecting relay connects its power input terminals 48—48 to its power output terminals 50—50 whenever the potential across its control terminals 46—46 is substantially zero.

When the null detecting relay 42 connects the power supply 14 to the stepping switch 52, i.e., when the voltage at the control terminals 46—46 is zero, the stepping switch 52 operates, in a well known manner, to cause the multipole switches 32 and 36 to switch, advancing the wipers 30 and 38 one contact simultaneously. This introduces the next voltage divider into the circuit. When the switching from one voltage divider to another has taken place, the voltage across the control terminals 46—46 will no longer be zero, since a voltage divided signal of a different magnitude will be added to the signal from the signal producing differential transformer 10. The null detecting relay will then disconnect the stepping switch from the power supply. Another multipole switch 54 is simultaneously operated with the other two multipole switches 32 and 36 as shown by the dotted line 40. The wiper 56 selects a series of outputs 58a, 58b and 58c which correspond to the voltage dividers 28a, 28b and 28c respectively. A common output 58d is connected to one side of the power supply output 60. The other side of the power supply output 60 is connected to the wiper 56 of the multipole switch 54. The power supply is connected to the line L1, L2.

The attenuator 26 of the present invention consists of two variable resistors 62 and 64 which are connected in series across the output of the differential transformer 20. The resistors 62 and 64 are ganged for simultaneous operation by the common control element 66.

Now referring to FIGURE 2, as the resistors 62 and 64 are varied by common control element 66 to any given percentage of the total variation possible, the resistance of the resistor 64 will vary linearly as shown in FIGURE 2 by the curve labeled $R_1$ and the resistance of variable resistor 62 will vary non-linearly as shown by the curve labeled $R_2$. The values of the two variable resistors in the attenuator are chosen in the following manner. The voltage dividers 28a, 28b and 28c are each selected to present the same total resistance to the output of the attenuator 26. This may be, for example, 200 ohms. The resistor 25 connected across the output of the signal producing differential transformer 10, may then be chosen to be 200 ohms also. Now to eliminate any difference in phase between the signals of the two transformers being introduced by the load applied across the output of the reference differential transformer 20 being different than the load applied across the output of the signal producing transformer 10, the reference transformer 20 should have at all times a load of 200 ohms across its secondaries 24. That is, each differential transformer should be presented with the same load.

Thus two conditions must be met by the attenuator 26:

(1) The ratio M of the magnitude of the potential across the output 68 of the attenuator 26 to the magnitude of the potential across the input 70, supplied by the secondaries 24 of the differential transformer 20, must be adjustable from zero to 1 by simultaneously adjusting the resistors 64 and 62, $R_1$ and $R_2$ respectively.

That is, from Ohm's law:

$$M = \frac{200 R_2 / 200 + R_2}{R_1 + \frac{200 R_2}{200 + R_2}} = \frac{200 R_2}{R_1 R_2 + 200(R_1 + R_2)}$$

(2) The impedance $R_L$ looking from the secondaries 24 of the differential transformer 20 must be constant, as given in the illustrative example 200 ohms (to match the resistance of resistor 25), regardless of the setting of the attenuator. That is, from the law of resistances:

$$R_L = 200 = \frac{R_1 + 200 R_2}{200 + R_2}$$

Solving the two equations simultaneously yields:

$$R_1 = 200(1 - M)$$

$$R_2 = 200 \frac{M}{1 - M}$$

or for the general case:

$$R_1 = C(1 - M)$$

$$R_2 = C \frac{M}{1 - M}$$

where C is the resistance of the voltage dividers 28 and the resistor 25.

It will be obvious to anyone skilled in the art that if the load on the attenuator 26 is a reactive impedance, reactive impedances may be substituted for the resistors 62 and 64 and the equations above may be solved for that case and the variable reactors of the attenuator may be chosen to fulfill the two conditions prescribed.

In operation, the voltage dividers 28a, 28b and 28c, which of course may be more than three in number, are preset so as to cause the stepping switch 52 to operate when the core 12 of the differential transformer 10 is at certain preselected positions. For example, the first voltage divider 28a will be connected into the circuit by the multipole switches 32 and 36 and the corresponding output 58a will be connected to the power supply by the stepping switch 54. When the core 12 of the differential transformer 10 attains the selected position, the signal from this signal producing differential transformer will be of the same magnitude as the signal derived from the voltage divider 28a, and the null actuated relay 42 will connect the power supply 14 to the stepping switch 52 and the multipole switches 32, 36 and 54 will switch to their next position. This immediately introduces into the circuit a new signal from the next voltage divider 28b which is different in magnitude than the signal from the signal producing differential transformer 10. Thus the signal applied to the null detecting relay 42 will no longer be null and the stepping switch 52 will be disconnected leaving the multipole switches 32, 36 and 54 at their second position, connecting the voltage divider 28b into the network and energizing the output circuit 58b, 58d. When the signal from the differential transformer 10 attains the same magnitude as the signal from the voltage divider 28b, the stepping switch will again be connected, thus introducing the voltage divider 28c and output 58c into the circuit and so on for as many times as there are separate voltage dividers.

When used in automatic batching the differential transformer core 12 of the signal producing differential transformer 10 will be actuated by a weighing platform. Each of the output circuits 58a, 58b and 58c will control a valve controlling the effluence of each ingredient of the batch onto the weighing platform. When the correct weight of the first ingredient has been applied to the weighing platform, the signal produced at the control terminals 45—46 of the null detecting relay 42 will be zero and the stepping switch will operate. This will turn off the valve which controls the effluence of the first ingredient to the weighing platform and open the valve which controls the effluence of the second ingredient to the weighing platform and simultaneously the second voltage divider will be introduced into the circuit. It will determine the magnitude of the total weight on the weighing platform when the second ingredient is cut off and the third ingredient starts to be added to the batch, etc. If there were no attenuator 26 this would resemble the circuits and apparatus disclosed in the previously described Macgeorge and Roessler applications.

When the attenuator of the present invention is incorporated into the control circuit, the voltage dividers 28a, 28b and 28c may be preset to batch a given formula, in batching, or to select actuating positions of the differential transformer core 12 in the general case when the control circuit is responsive to a variable of position. The common control member 66 of the attenuator 26 will be associated with a dial preferably having a percentage scale, and the attenuator may be set to cause all the switching operations to take place at weights which are a constant percentage of the weights at which the switching actions would take place if there were no attenuator, in the case of batching; or at a constant percentage of each position at which the switching would take place if there were no attenuator, in the general case of actuation of the differential transformer 10 by a variable of position.

It will be obvious to one skilled in the art that the control circuit disclosed herein and specifically described as being applicable to automatic batching may be applied to any situation in which a control circuit is desired which responds to a variable of position; in which it is desired that switching actions take place at given positions of that variable; and in which it is desired to vary the positions at which switching takes place simultaneously and in equal proportion. It will also be obvious to anyone skilled in the art that the combination of a differential transformer and the attenuator of this invention for attenuating the signal of the differential transformer in magnitude but not in phase, when the load to which the attenuator signal is to be applied is constant, has broad applicability to many differential transformer applications.

It will thus be seen that the objects set forth, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A differential transformer circuit providing a potential which is a function of the differential transformer core position and including means for varying the magnitude of said potential independently of phase comprising, in combination, a differential transformer providing a two terminal secondary output, first and second variable impedances connected in series across said differential transformer output, means for simultaneously varying the values of the said impedances such that the series impedance thereof presented to said differential transformer across said secondary output remains substantially constant and means for taking the output of said differential transformer circuit from the second of said variable impedances.

2. The circuit of claim 1 and a common control element adapted for simultaneous variation of said first and second variable impedances.

3. A differential transformer circuit providing a potential which is a function of the differential transformer core position and including means for varying the magnitude of said potential independently of phase comprising, in combination, a differential transformer providing a two terminal secondary output, first and second variable impedances connected in series across said differential transformer output, means including a common control element for simultaneously varying said first and second variable impedances such that the series impedance thereof presented to said differential transformer across said secondary remains substantially constant, said first variable impedance varying linearly and said second variable impedance varying non-linearly with variation of said control element, and means for taking the output of said differential transformer circuit from the second of said variable impedances.

4. The circuit of claim 2 in which all of said impedances are substantially resistive in nature.

5. The circuit according to claim 2 including a substantially constant impedance load connected across the output thereof, said first and second variable impedances being so chosen in magnitude and said control elements simultaneously varying said impedances in such a manner that when the voltage of the potential appearing across the said outlet of said circuit is varied by means of said control element, the impedance presented to said differential transformer across the said secondary output remains substantially constant, said impedances being substantially resistive in nature.

6. The circuit of claim 3 in which all of said impedances are substantially resistive in nature.

7. The circuit of claim 6 in which the relationship between the resistances of said first and second variable impedances is defined by the formulas:

$$R_1 = C(1-M)$$
$$R_2 = C\frac{M}{1-M}$$

where $R_1$ is the resistance of the first impedance, $R_2$ is the resistance of the second impedance, C is a constant, and M is the ratio of the magnitude of the potential at said output of said circuit to the magnitude of the potential at the output of said differential transformer.

8. In a control circuit activated by a physical displacement, the combination comprising, a first differential transformer producing a displacement signal, a second differential transformer producing a reference signal, an attenuator for attenuating said reference signal, a plurality of voltage dividers having respectively substantially equal total resistances, a plurality of output circuits controlled by said control circuit, a null detecting relay and a stepping switch, the attenuated reference signal being applied to each of said voltage dividers in turn by means of said stepping switch, the attenuated reference signal as modified by each of said voltage dividers being algebraically added in turn to said displacement signal by means including said stepping switch, the signal resultant of said addition being applied to the control terminals of said null detecting relay, said relay being adapted to apply a stepping signal to actuate said stepping switch when said resultant signal is substantially at null, said stepping switch controlling the selection in turn of each of said output circuits and maintaining a correspondence between said voltage dividers and output circuits whereby selected ones of said voltage dividers are connected in circuit with corresponding ones of said output circuits at respective predetermined displacements.

9. The combination of claim 8 in which said attenuator is adapted to provide a substantially constant load impedance for said second differential transformer.

10. The combination of claim 9 in which said attenuator comprises, in combination, a first and a second variable resistor connected in series across the output of said second differential transformer.

11. The combination of claim 10 and a common control element for varying said variable resistors simultaneously, the resistance of each of said resistors being at a maximum when the other is at a minimum, the resistance of said first variable resistor varying linearly and the resistance of said second variable resistor varying non-linearly with variation of said common control element.

12. The combination of claim 9 and an impedance connected across the output of said first differential transformer substantially equal to said load impedance across the output of said second differential transformer.

13. The combination of claim 11 in which the relationship between the resistances of said variable resistors is defined by the formulas:

$$R_1 = C(1-M)$$
$$R_2 = C\frac{M}{1-M}$$

where $R_1$ is the resistance of said first variable resistor, $R_2$ is the resistance of said second variable resistor, C is a constant and M is the ratio of the magnitude of the potential applied across said variable resistors in series to the magnitude of the potential across said second variable resistor.

14. In a circuit of the class described, a network comprising secondaries of a reference differential transformer in effective series bucking relation across a shunt potentiometer the slider contact of which is manually adjustable, a potential responsive device, a signalling transducer having secondaries in effective series opposition and one end of which is connected with said device and the other end of which connects to an end of said potentiometer, said slider being connected to said device whereby a resultant signal is imposed on said device, and attenuating means in the circuit between said reference secondaries and said shunt potentiometer, whereby the reference voltage applied across said shunt potentiometer can be predeterminedly varied, without varying the phase of said reference voltage, and with the voltage from said reference secondaries remaining substantially constant in magnitude.

15. In a circuit of the class described, a network comprising a reference differential transformer having secondary coils in series bucking relation, an energizing primary and an armature adjustable ot vary the potential induced in said coils to furnish a selected reference voltage as the output of said secondaries, at least one potentiometer coupled to said coils and having an adjustable slider contact, a potential-responsive device, a condition-responsive differential transformer having secondary coils in series bucking relation, said latter coils being connected in series with one of said potentiometer and also being connected with said device, said latter transformer including an energizing primary and an armature positioned functionally in response to changes in condition of an associated variable, and variable attenuating means between the secondary coils of said reference transformer and said potentiometer to vary selectively the attenuation of the reference voltage on said potentiometer.

16. A circuit as set forth in claim 15 in which the variable attenuating means comprises a first variable resistance in series with one of said reference secondary coils, and a second variable resistance coupled to said first variable resistance and being disposed substantially in parallel with said first potentiometer, and means for adjusting the respective resistances of said first and second variable resistances.

17. A circuit as set forth in claim 16 in which said means for adjusting includes sliders of the first and second variable resistances which can be simultaneously and uniformly moved on the respective first and second variable resistances.

18. In a control circuit activated by a physical displacement, the combination comprising, a first differential transformer producing a displacement signal, a second differential transformer producing a reference signal, voltage varying means adapted to vary the voltage of said reference signal without varying the impedance presented to said second differential transformer, a plurality of voltage dividers of substantially equal total resistance, a plurality of output circuits controlled by said control circuit, a null detecting relay and a stepping switch, the varied reference signal being applied to each of said voltage dividers in turn by means of said stepping switch, the varied reference signal as modified by each of said voltage dividers being algebraically added in turn to said displacement signal by means of said stepping switch, the signal resultant of said addition being applied to the control terminals of said null detecting relay which is adapted to apply a stepping signal to said stepping switch when said resultant signal is substantially at null, said stepping switch controlling the selection in turn of each of said output circuits and maintaining a correspondence between said voltage dividers and output circuits, whereby said voltage dividers may be preset to cause the selection of each of said output circuits at a predetermined displacement.

19. A signal comparison control circuit comprising: first and second differential transformers having respective output secondary windings, said first transformer being constructed to produce a constant predetermined first signal and said second transformer being constructed to produce a varying second signal responsive to changes in a variable as it affects the position of the armature of said second transformer, a plurality of impedance elements respectively representative of predetermined values of said variable, impedance means in circuit with the output winding of said first transformer and with said plurality of impedance elements which is adjustable to supply a desired percentage of said first signal to said plurality of impedance elements, said impedance means being constructed to present a substantially constant impedance to the output of said first transformer, signal comparison means to which said second signal is applied, switching means coupled to said impedance means, to said plurality of impedance elements, to said signal comparison means, and to a plurality of output circuits which are to be sequentially operated, said switching means being constructed to apply said first signal via selected ones of said plurality of impedance elements in sequence to said signal comparison means whereupon said comparison means produces a signal representative of the difference in the values of said first and second signals, said switching means being constructed simultaneously to initiate the operation of a corresponding one of said output circuits, said signal comparison means also being constructed to actuate said switching means when, due to the operation of said corresponding output circuit, the armature of said second transformer is moved to a position at which said second signal substantially equals said first signal whereupon said switching means couples said impedance means to the next of said plurality of impedances in said sequence and causes the corresponding next one of said output circuits to be operated until the said first and second signals again substantially cancel one another.

References Cited in the file of this patent

UNITED STATES PATENTS

| | | |
|---|---|---|
| 1,831,006 | Horsely et al. | Nov. 10, 1931 |
| 2,568,588 | Macgeorge | Sept. 18, 1951 |
| 2,574,311 | Zuschlag | Nov. 6, 1951 |
| 2,611,812 | Hornfeck | Sept. 23, 1952 |
| 2,708,730 | Alexander et al. | May 17, 1955 |
| 2,770,768 | Exner | Nov. 13, 1956 |
| 2,794,971 | Hornfeck | June 4, 1957 |
| 2,862,176 | Lustig | Nov. 25, 1958 |
| 2,892,147 | Bell | June 23, 1959 |